ical Us005995577A

United States Patent [19]
Matzner

[11] Patent Number: 5,995,577
[45] Date of Patent: *Nov. 30, 1999

[54] OPTIMIZED STEAM VENT LOCATIONS FOR A NUCLEAR FUEL BUNDLE

[75] Inventor: Bruce Matzner, San Jose, Calif.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/798,166

[22] Filed: Feb. 10, 1997

[51] Int. Cl.$^6$ .................................................... G21C 3/30
[52] U.S. Cl. ........................................... 376/435; 376/444
[58] Field of Search .................................... 376/435, 444, 376/443, 434, 446

[56] References Cited

U.S. PATENT DOCUMENTS

| | | | |
|---|---|---|---|
| 4,560,532 | 12/1985 | Barry et al. | 376/434 |
| 4,588,550 | 5/1986 | Blomstraud et al. | 376/434 |
| 4,818,473 | 4/1989 | Lui | 376/446 |
| 4,863,680 | 9/1989 | Sakurada et al. | 376/444 |
| 4,876,063 | 10/1989 | Johansson | 376/444 |
| 4,968,479 | 11/1990 | Ogiya et al. | 376/444 |
| 5,017,332 | 5/1991 | Dix et al. | 376/435 |
| 5,068,082 | 11/1991 | Ueda et al. | 376/435 |
| 5,202,085 | 4/1993 | Aoyama et al. | 376/435 |
| 5,359,634 | 10/1994 | Johannesson | 376/435 |
| 5,432,829 | 7/1995 | Aoyama et al. | 376/435 |
| 5,555,281 | 9/1996 | Williamson et al. | 376/435 |

FOREIGN PATENT DOCUMENTS

| | | | |
|---|---|---|---|
| 0224092 | 11/1985 | Japan | 376/435 |
| 2076487 | 4/1987 | Japan | 376/435 |
| 2151785 | 7/1987 | Japan | 376/444 |
| 3252289 | 10/1988 | Japan | 376/444 |
| 3179293 | 8/1991 | Japan | 376/444 |
| 5157867 | 6/1993 | Japan | 376/443 |
| 5232273 | 9/1993 | Japan | 376/444 |

*Primary Examiner*—Harvey E. Behrend
*Attorney, Agent, or Firm*—Nixon & Vanderhye

[57] ABSTRACT

A nuclear fuel bundle has full-length and part-length fuel rods, the latter defining vent volumes interspersed among the full-length fuel rods. The vent volumes afford critical power enhancement by efficiently transferring liquid to adjacent full-length fuel rods. Except for full-length fuel rods adjacent unheated surfaces, for example, the channel and water rods, each fuel rod lies face adjacent a steam vent volume and full-length fuel rods diagonally adjacent a steam vent volume lie face adjacent at least one other steam vent volume whereby, except for full-length fuel rods adjacent non-heat generating surfaces, enhanced critical power performance is applicable to all full-length fuel rods notwithstanding diagonal location of full-length fuel rods relative to a steam vent volume.

7 Claims, 8 Drawing Sheets

◯ STEAM VENT POSITION

⦿ FULL LENGTH FUEL ROD

PREFERRED STEAM VENT LOCATIONS

UNDESIRABLE LOCATIONS

○ STEAM VENT POSITION

◍ FULL LENGTH FUEL ROD

◯ STEAM VENT POSITION

⊕ FULL LENGTH FUEL ROD

STEAM VENT POSITION

FULL LENGTH FUEL ROD

○ STEAM VENT POSITION

⦶ FULL LENGTH FUEL ROD

○ STEAM VENT POSITION

⦶ FULL LENGTH FUEL ROD

OPTIMIZED STEAM VENT LOCATIONS FOR A NUCLEAR FUEL BUNDLE

TECHNICAL FIELD

The present invention relates to a nuclear fuel bundle having full and part-length fuel rods with vent volumes above the part-length fuel rods and particularly relates to the location of the vent volumes within the bundle for optimizing critical power performance.

BACKGROUND

In many nuclear fuel bundles for boiling water reactors, the fuel bundle contains an array of full-length fuel rods and a considerably lesser number of part-length fuel rods. The part-length fuel rods define steam vent volumes within the bundle and channel in the spaces above the part-length rods. It will be appreciated that the steam vent volumes do not themselves produce power. The part-length fuel rods and the associated steam vent volumes are a trade-off between critical power production and the desirable pressure drop reduction capability of the steam vent volumes. It will also be appreciated that the overall objective of any nuclear fuel bundle design is to optimize the performance of each fuel rod. The overall performance of the bundle, however, is no better than the performance of any individual fuel rod and, consequently, critical power is a function of the power achieved by the bundle before the first rod overheats.

Recently, it has been demonstrated that the region above the individual part-length fuel rods can be equipped with critical power enhancement devices such as swirlers. Those devices improve the critical power performance of the surrounding rods without negating the pressure drop reduction capability of the steam vent volume. However, the location of the steam vent volumes within the fuel bundle is believed not to have been considered previously with respect to its impact on the critical power performance of the fuel rods.

DISCLOSURE OF THE INVENTION

In accordance with the present invention, critical power performance of the fuel bundle can be optimized by locating the steam vent volumes at particular positions in the lattice of the fuel bundle. Particularly, it has been discovered by observation and test results that critical power performance of the bundle can be enhanced by locating the steam vent volumes in accordance with certain general principles. First, steam vent volumes should not be placed in lattice positions adjacent unheated surfaces, i.e., non-heat generating surfaces. These surfaces may comprise the channel walls or one or more water rods. The critical power enhancement provided by the steam vent volumes equipped, for example, with swirlers, would be lost by flowing large amounts of liquid to those unheated surfaces. Secondly, for as many full-length fuel rods as possible that are diagonally adjacent a steam volume, the diagonally adjacent full-length rod should also lie face adjacent another steam vent volume. The optimum transfer of liquid from the steam vent volume is to the fuel rod or rods that are closest to the steam vent volume, i.e., those rods which lie face adjacent the steam vent volume. By a face adjacent fuel rod is meant that fuel rod which lies adjacent the steam vent volume in one of the two mutually perpendicular rows in the lattice or array of fuel rods in the fuel bundle, one row of which has a lattice position corresponding to the lattice position of the steam vent volume. It will be appreciated that the full-length fuel rods diagonally adjacent the steam vent volume are further away from the steam vent volume and, therefore, the critical power performance enhancement afforded by the steam vent volume to the diagonally face adjacent rod is less than the face adjacent rod. Consequently, if other steam vent volumes are not located properly within the fuel bundle, the one fuel rod limiting critical power performance will be the diagonally adjacent fuel rod. That, however, is not an optimum configuration because the power performance of the diagonally adjacent fuel rod can be enhanced by locating it face adjacent another steam vent volume, thereby affording improvement in critical power performance. Ideally, there should be a minimum number of vent locations consistent with the trade-off between the pressure drop reduction capability afforded by the steam vent volume and critical power performance without any diagonally adjacent full-length fuel rods which do not also lie face adjacent a steam vent volume.

Thirdly, for a minimum number of steam vent locations, the locations should be arranged in a lattice in an essentially L-shaped pattern wherever possible. By an L-shaped pattern is meant that each vent volume should be disposed in a position in the lattice spaced one and two lattice positions in respective mutually perpendicular rows from another steam vent volume. In other words, by repeating to the extent possible the L-shaped pattern of steam vent volumes within the fuel bundle, the fuel bundle designer can optimize the critical power performance of the bundle through proper location of the steam vent volumes.

In a preferred embodiment according to the present invention, there is provided a nuclear fuel bundle comprising non-heat generating surfaces including a fuel channel, a plurality of full-length fuel rods disposed in the channel, a plurality of part-length fuel rods disposed in the channel and defining vent volumes above the part-length rods, the vent volumes being interspersed within the fuel channel and among the full-length fuel rods such that, except for full-length fuel rods lying adjacent the non-heat generating surfaces, each full-length fuel rod lies face adjacent at least one vent volume and each full-length fuel rod diagonally adjacent the one vent volume lie face adjacent another vent volume.

In a further preferred embodiment according to the present invention, there is provided a nuclear fuel bundle comprising a fuel channel, a plurality of full-length fuel rods disposed in the channel and a plurality of part-length fuel rods defining vent volumes above the part-length fuel rods, the plurality of full-length and part-length fuel rods being disposed in a 10×10 array of lattice positions within the bundle, the vent volumes being interspersed within the fuel channel in accordance with a pattern as illustrated in one of FIGS. 3, 4A, 4B, 5A, 5B or 7.

Accordingly, it is a primary object of the present invention to optimize the critical power performance of a nuclear fuel bundle by specifically locating the steam vent volumes above the part-length fuel rods within the bundle.

BEST MODE FOR CARRYING OUT THE INVENTION

Figure 1:
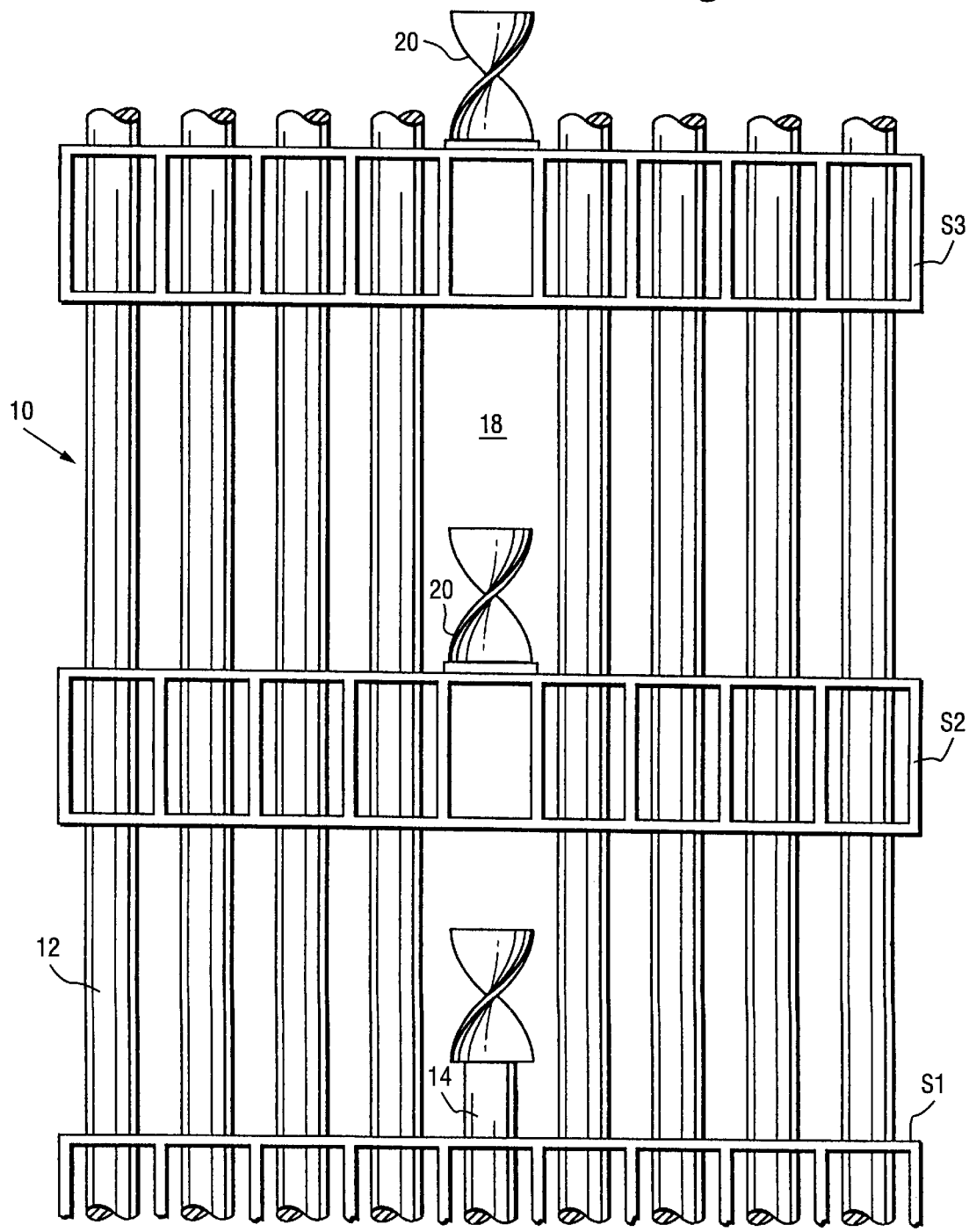
FIG. 1 is a fragmentary vertical cross-sectional view through a nuclear fuel bundle illustrating full-length fuel rods surrounding a vent volume above a part-length fuel rod.

Referring now to the drawings, particularly to FIG. 1, there is illustrated a portion of a nuclear bundle, generally designated 10, having a plurality of full-length fuel rods 12, a single part-length fuel rod 14, the fuel rods being disposed in spacers S1, S2 and S3 at vertically spaced positions along the fuel bundle 10. The space above the part-length fuel rod 14 within the fuel bundle defines a vent volume 18. Critical power enhancement devices such as swirlers 20 mounted on the spacers S2 and S3 and either to spacer S1 or the end of the part-length fuel rod 14 (as shown on the figure) are provided. It will be appreciated that the enhancement devices transport liquid from the vent volumes 18 onto the adjacent fuel rods, enhancing critical power performance.

Figure 2:
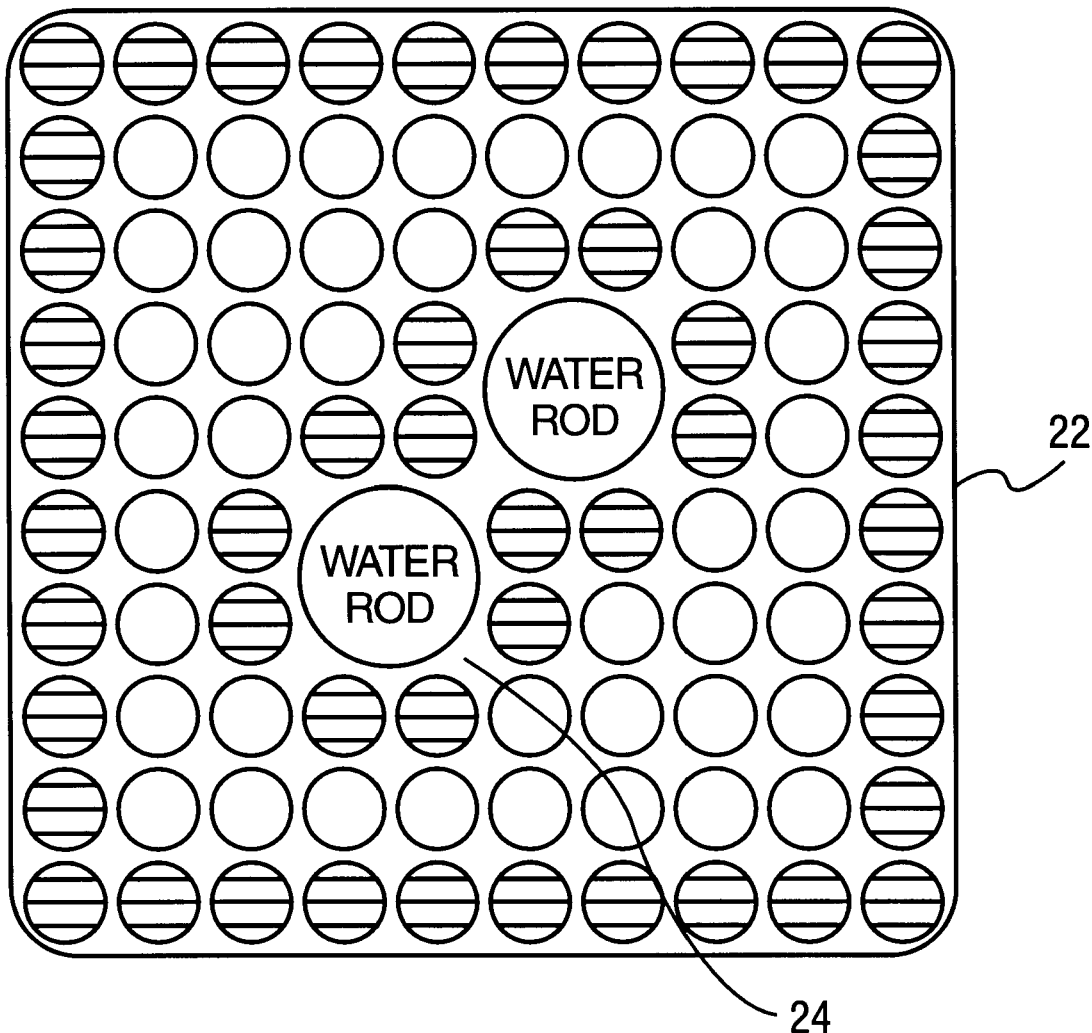
FIGS. 2 and 3 illustrate possible positions of steam vent locations relative to undesirable positions of steam vent volumes within each of two different fuel bundles.
Figure 2:
Figure 2:
Figure 3:
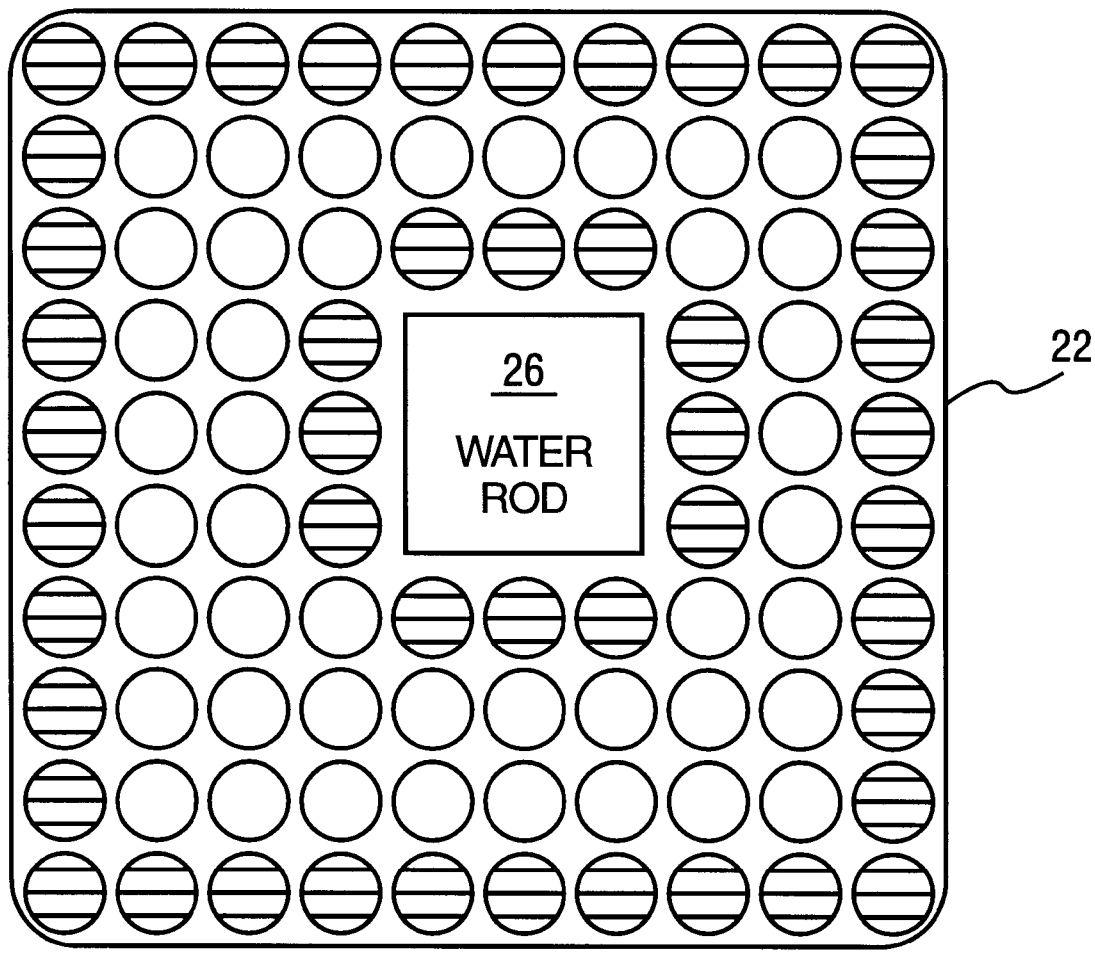

Referring to FIGS. 2 and 3, there is illustrated a typical 10×10 array of fuel rods within a fuel bundle 10, surrounded by a fuel channel 22. As well known and as will be appreciated from a review of FIGS. 2 and 3, the fuel rods in a fuel bundle are disposed in mutually perpendicular rows in an array or matrix of fuel bundles with each fuel rod occupying a lattice position or one or more water rods occupying one or more lattice positions. Water rods are illustrated in FIGS. 2 and 3 at 24 and 26, respectively. The lattice positions illustrated in FIGS. 2 and 3 indicate locations of steam vent volumes 18 within the fuel bundle which are preferred (the open circles) and undesirable (the inscribed circles). These steam vent locations do not refer to an actual fuel bundle but are illustrative of only possible steam vent locations and undesirable steam vent locations. For example, in FIG. 2, it will be seen that the lattice positions lying adjacent the channel 22, i.e., an unheated or non-heat generating surface, are all undesirable locations for steam vent volumes. Additionally, the lattice positions surrounding the water rods are also undesirable steam vent locations because the water rods likewise represent unheated, i.e., non-heat generating surfaces. The remaining positions illustrated by the open circles may be considered by a fuel bundle designer as a potential location for a steam vent volume. Consequently, FIGS. 2 and 3 are illustrative of a first guideline in accordance with the present invention for locating steam vent volumes within a fuel rod bundle, i.e., that steam vent volume should not be placed in lattice positions adjacent unheated surfaces, which may comprise channel walls or water rods, because significant quantities of liquid would be transported to those unheated surfaces without enhancing critical power performance.

Figure 4A:
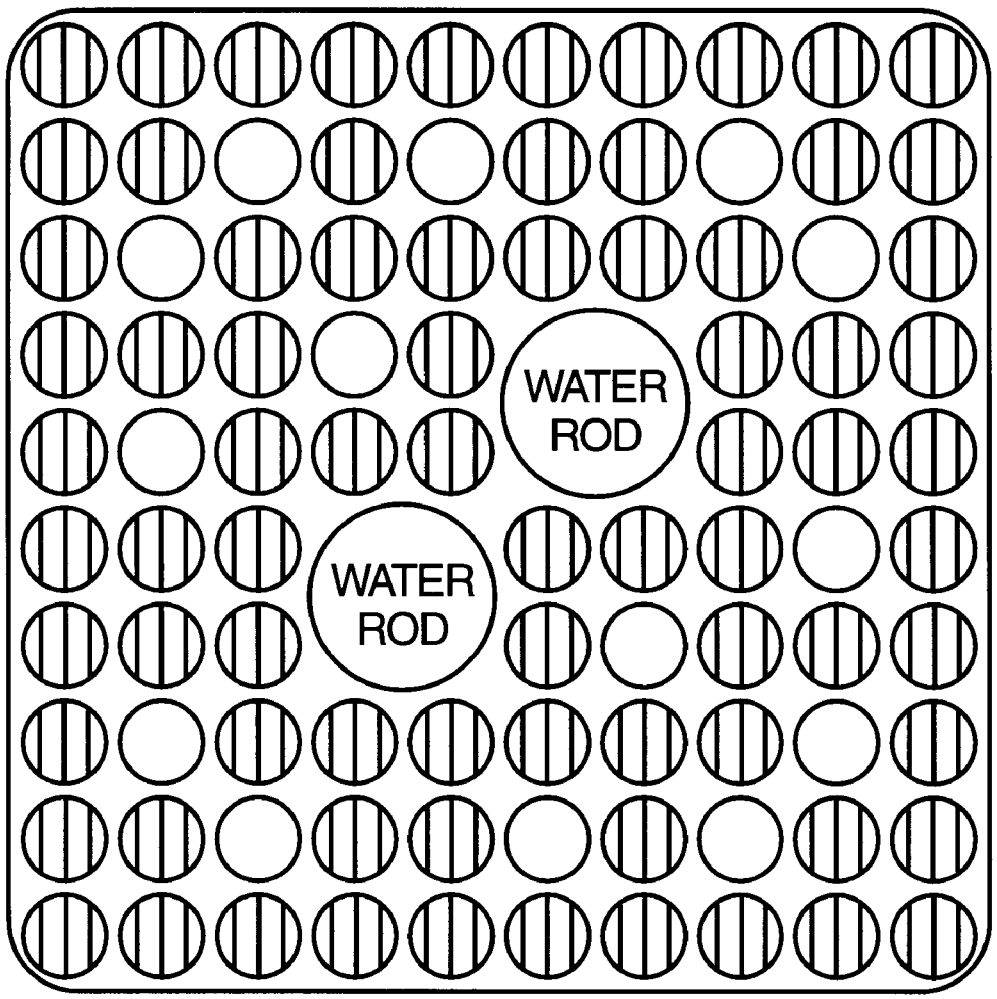
FIGS. 4a, 4b, 5a, 5b illustrate preferred positions of the steam vent volumes and full-length fuel rods in different 10×10 arrays of fuel rod bundles.
Figure 4B:
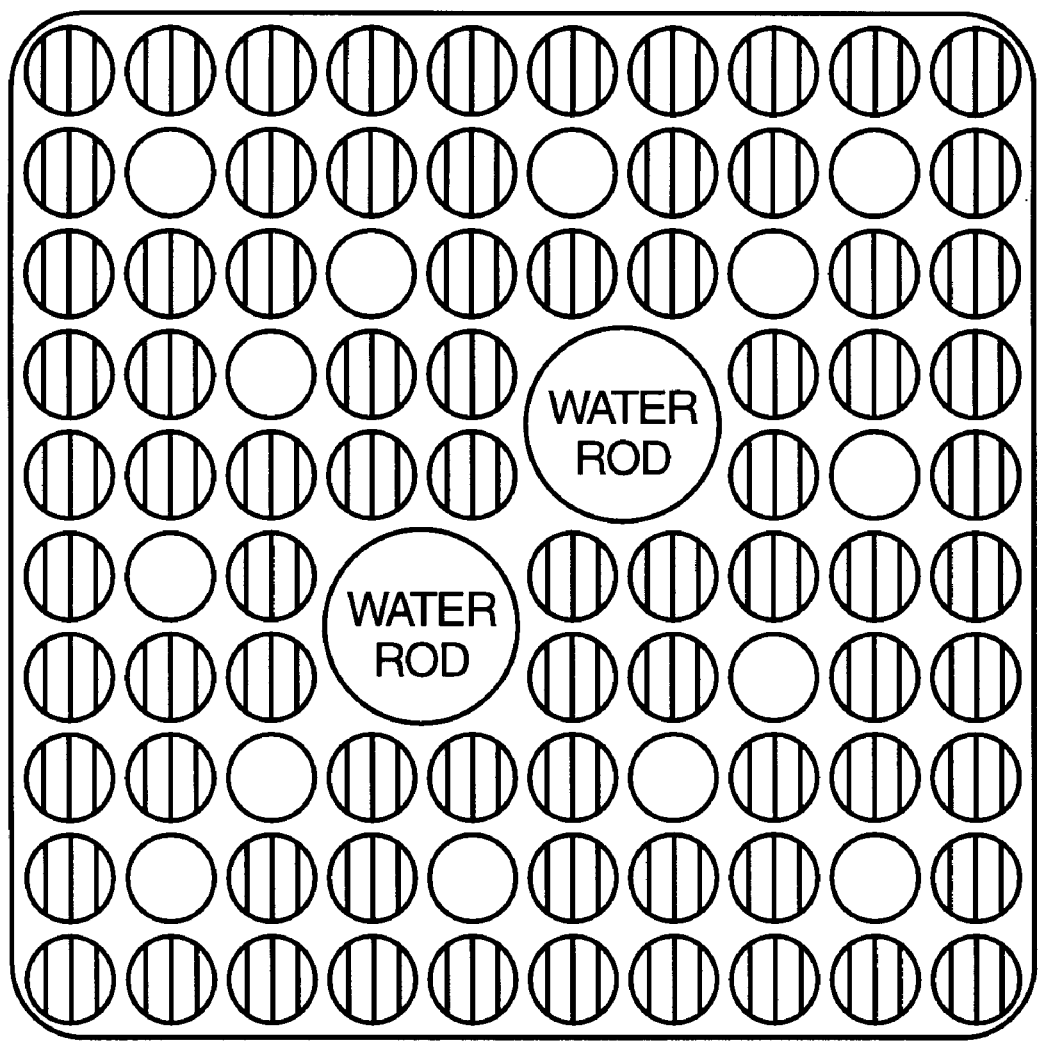

Referring to FIGS. 4a and 4b, there is illustrated a 10×10 array of fuel rods in a nuclear fuel bundle with fuel rod and steam vent volumes located in predetermined positions in accordance with the present invention. As illustrated in both of FIGS. 4a and 4b, the steam vent positions are illustrated by the open circles and the full-length fuel rods are illustrated by the inscribed circles. It will be appreciated that the steam vent positions illustrated by the open circles lie above part-length fuel rods as illustrated in FIG. 1. In FIG. 4a, the fuel bundle also includes water rods which occupy certain lattice positions within the fuel bundle. For example, using X and Y coordinates for the lattice positions, with the origin of the x and y axes at the lower left corner of the fuel bundle in each of drawing FIGS. 2 through 7, the upper water rod occupies lattice position 6, 7; 7, 7; 6, 6; and 7, 6. The lower water rod occupies lattice positions 4, 5; 5, 5; 4, 4; and 5, 4. The water rods in FIG. 4b occupy the same lattice positions as in the fuel bundle of FIG. 4a. However, it will be seen that the steam vent volumes are differently located as compared with the steam vent volumes of FIG. 4a, all in accordance with guidelines set forth as part of the present invention. Thus, it will be seen in accordance with the first guideline in each of the fuel bundles of FIGS. 4a and 4b that the steam vent volumes are not located in the marginal rows of the fuel bundle. Nor are the steam vent volumes located in the lattice positions surrounding the water rods. In both cases, full-length fuel rods lie adjacent those unheated channel and water rod surfaces.

In order to select the location of the steam vent volume in the possible remaining locations, for example, as illustrated by the open circles of FIG. 2 in the fuel bundle array of FIGS. 4a and 4b, the steam vent volumes should, as far as possible, be located such that each full-length fuel rod lies face adjacent at least one vent volume and no vent volume lies face adjacent an unheated surface of the bundle. For example, and referring to FIG. 4a, the steam vent volume at lattice position 3, 9 has full-length fuel rods at lattice positions 3, 10; 4, 9; 3, 8; and 2, 9 face adjacent to the steam vent volume. The full-length fuel rod at lattice position 4, 8, however, lies diagonally adjacent the steam vent volume at lattice position 3, 9 and, consequently, absent the present invention, the enhancement to critical power performance would not be effective with respect to the diagonally adjacent full-length fuel rod except that it is also face adjacent a steam vent volume at lattice position 4, 7. Consequently, except for those full-length fuel rods adjacent unheated surfaces, all other full-length fuel rods lie face adjacent at least one steam vent volume. Similarly, a review of FIG. 4b reveals also that except for the full-length fuel rods adjacent the unheated surfaces of the channel and water rods, all other full-length fuel rods lie face adjacent at least one steam vent volume. Consequently, to the extent the full-length fuel rods diagonally adjacent the steam vent volume diminish critical power performance enhancement as a result of that location, their critical power performance is enhanced because they also lie face adjacent another steam vent volume.

Figure 5A:
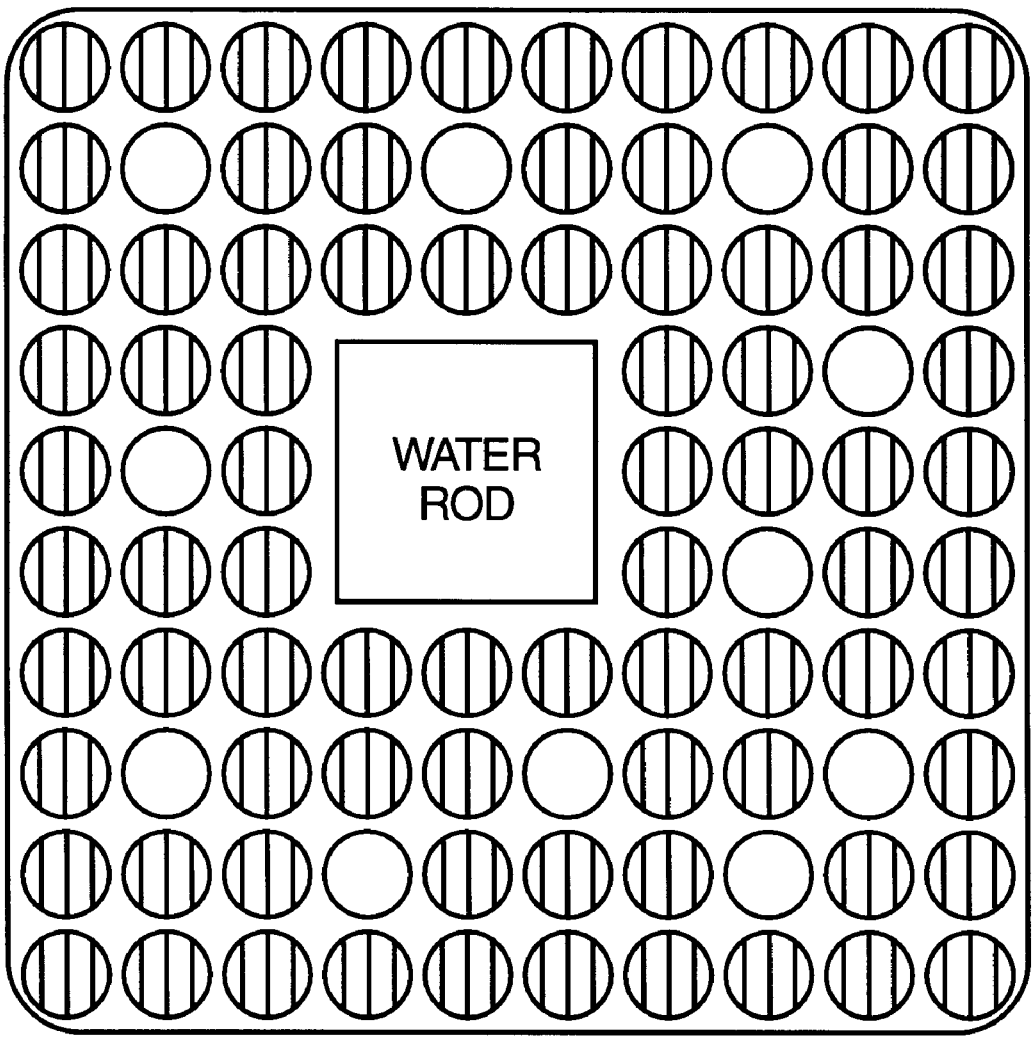
Figure 5B:
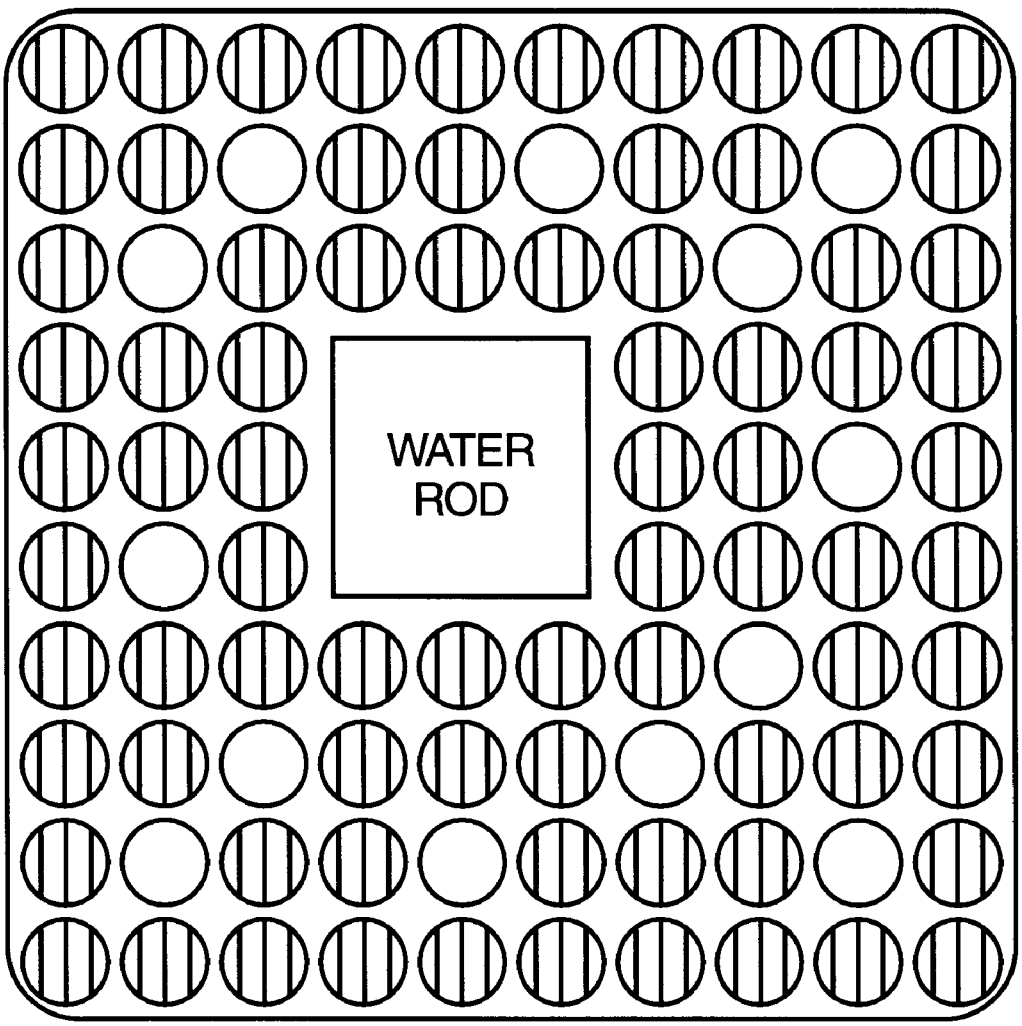
Figure 5B:
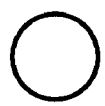
Figure 5B:

Referring now to FIGS. 5a and 5b, there is illustrated a nuclear fuel rod bundle containing a water rod occupying nine lattice positions, as evident from a review of these drawing figures. The same guidelines are applicable to the fuel bundle configurations illustrated in FIGS. 5a and 5b. For example, in FIG. 5a, it will be seen that, except for the full-length fuel rods that lie adjacent the unheated surfaces, i.e., the channel and water rod, each full-length fuel rod lies face adjacent at least one steam vent volume lattice position and full-length fuel rods lie diagonally adjacent the one steam vent volume face adjacent another steam vent volume position. It will also be appreciated that where possible in providing a minimum number of steam vent locations, they are arranged in the lattice in L-shaped patterns. That is, each vent volume, where possible, should be disposed in a position in the lattice spaced one and two lattice positions in two mutually perpendicular rows from at least one other steam vent volume. For example, referring to FIG. 5a, the steam vent volume at lattice position 8, 9 lies two lattice positions, i.e., from row 8 to row 6 in the direction of the Y-axis and one lattice position to the right, i..e, in the X-axis direction in row 9 from another steam vent volume. As a further example, the steam vent volume at lattice position 8, 2 lies one lattice position from row 2 in the Y-axis direction and two lattice positions in the X-axis direction in row 8 to another steam vent volume at lattice position 6, 13. Patterns of these L-shaped positions of steam vent volumes can readily be identified from FIGS. 5a and 5b. It will also be appreciated that not all steam vent volumes can be located in these L-shaped patterns, although only a few such steam vent volumes are not so located. For example, in FIG. 5a, the steam vent volume at lattice position 2, 9 is not spaced one and two lattice positions in respect of mutually perpendicular rows from another steam vent volume. However, for a minimum number of steam vent locations, the steam vent volume should be arranged in the lattice in an L-shaped pattern as described wherever possible.

Figure 6:
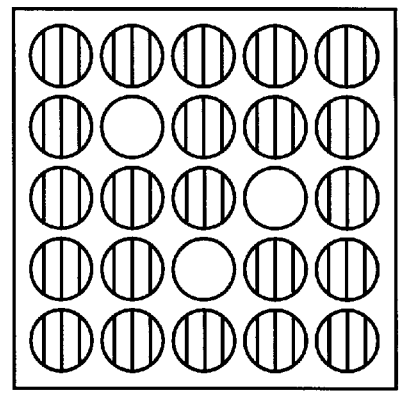
FIG. 6 is a schematic illustration of the location of steam vent locations vis-a-vis full-length fuel rods within a 5×5 array of fuel rods.

Referring to FIG. 6, there is illustrated a 5×5 array of fuel rods, with three steam vent volumes. Except for the full-length rods which lie adjacent the channel surrounding the bundle, each full-length rod lies face adjacent at least one steam vent volume whereby critical power enhancement is afforded by the steam vent volume even with respect to vent volume locations having a diagonally adjacent full-length rod.

Figure 7:
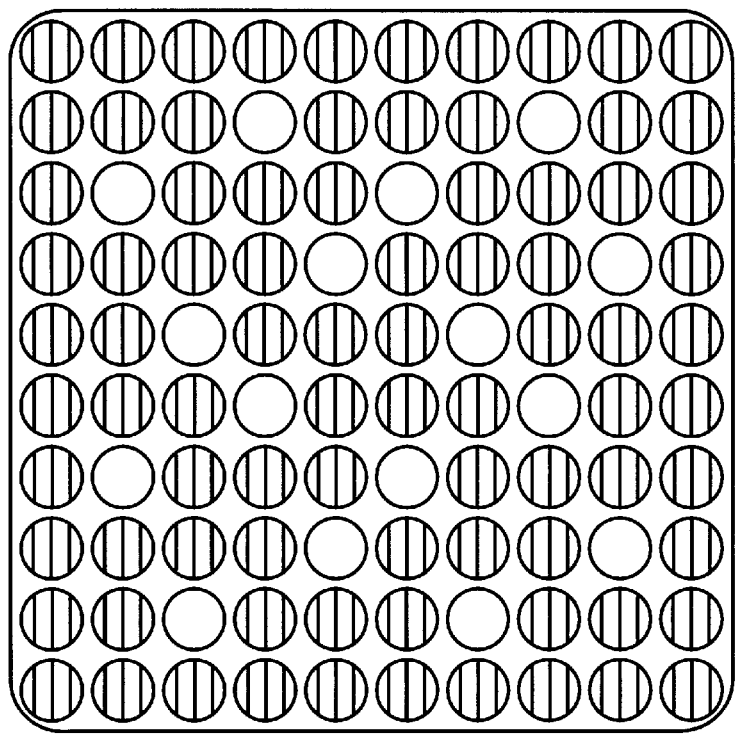
FIG. 7 is a view similar to FIG. 6 illustrating the locations of steam vent positions and full-length fuel rods in a 10×10 array of fuel rods within a bundle and without water rods.

Referring now to FIG. 7, there is illustrated an array of full-length fuel rods interspersed with steam vent volumes and without water rods. Except for the full-length fuel rods marginally adjacent the fuel bundle channel, each full-length fuel rod lies face adjacent a steam vent volume and each full-length fuel rod diagonally adjacent a steam vent volume also lies adjacent at least one other steam vent volume. Consequently, even those fuel rods lying diagonally adjacent to a steam vent volume have critical power performance enhancement afforded by lying face adjacent another steam vent volume.

Consequently, it will be appreciated that in accordance with the present invention, the one nuclear fuel rod in the bundle which might otherwise be a limiting rod with respect to critical power performance, i.e., a full-length fuel rod diagonally adjacent a steam vent volume, can, by proper placement of the steam vent volumes, have enhanced critical power performance. That is, where possible, the full-length fuel rod diagonally adjacent a steam vent volume should lie face adjacent another steam vent volume to take advantage of the critical power performance enhancement afforded by the steam vent volume.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nuclear fuel bundle comprising:

non-heat generating surfaces including a fuel channel;

a plurality of full-length fuel rods disposed in said channel;

a plurality of part-length fuel rods disposed in said channel and defining vent volumes above said part-length rods;

said fuel rods being located in a lattice configuration in mutually perpendicular rows with the fuel rods of each row in one direction aligned with the fuel rods of adjacent rows in a perpendicular direction, said vent volumes being disposed in the lattice configuration above the part-length fuel rods with full-length fuel rods face adjacent said vent volumes and full-length fuel rods diagonally adjacent said vent volumes;

said vent volumes being interspersed within said fuel channel and among said full-length fuel rods such that, except for full-length fuel rods lying adjacent said non-heat generating surfaces, each said full-length fuel rod lies face adjacent at least one vent volume and each full-length fuel rod diagonally adjacent the one vent volume, and not adjacent said non-heat generating surfaces, lies face adjacent another vent volume.

2. A nuclear fuel bundle according to claim 1 wherein only full-length fuel rods lie face adjacent said non-heat generating surfaces.

3. A nuclear fuel bundle according to claim 1 wherein the majority of the vent volumes are disposed such that each vent volume of said majority thereof lies in a position in the lattice spaced one and two lattice positions in respective mutually perpendicular rows from another vent volume.

4. A nuclear fuel bundle according to claim 1 wherein said non-heat generating surfaces include at least one water rod through said bundle.

5. A nuclear fuel bundle according to claim 1 wherein said full-length fuel rods and said part-length fuel rods are disposed in lattice positions corresponding to X, Y coordinates in a Cartesian coordinate system.

6. A nuclear fuel bundle according to claim 5 wherein said bundle comprises a 10×10 array of fuel rods with said vent volumes being located at the following X, Y coordinate positions in the array: 3, 9; 5, 9; 8, 9; 2, 8; 9, 8; 4, 7; 2, 6; 9, 5; 7, 4; 2, 3; 9, 3; 3, 2; 6, 2; and 8, 2.

7. A nuclear fuel bundle according to claim 6 including water rods in said bundle at X, Y coordinates 6, 7; 7, 7; 6, 6; 7, 6; 4, 5; 5, 5; 4, 4; and 5, 4.

* * * * *